US007801789B1

(12) United States Patent
Cohler et al.

(10) Patent No.: US 7,801,789 B1
(45) Date of Patent: Sep. 21, 2010

(54) STABILIZED MONTE CARLO TECHNIQUE AND METHOD AND SYSTEM OF APPLYING SAME TO VALUATE ASSETS INCLUDING DERIVATIVE SECURITIES

(75) Inventors: L. Eugene Cohler, Weston, CT (US); Steven D. Kugelmass, Englewood, NJ (US); Mark D. Feldman, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 1329 days.

(21) Appl. No.: 10/638,087

(22) Filed: Aug. 8, 2003

(51) Int. Cl.
*G06Q 40/00* (2006.01)

(52) U.S. Cl. .................. 705/36 R; 705/36; 705/37; 705/35; 705/44

(58) Field of Classification Search .............. 705/35–45; 700/90
See application file for complete search history.

(56) References Cited

U.S. PATENT DOCUMENTS

| | | | | |
|---|---|---|---|---|
| 6,061,662 | A * | 5/2000 | Makivic | 705/36 R |
| 6,208,738 | B1 * | 3/2001 | Goldenfeld et al. | 380/287 |
| 6,772,136 | B2 * | 8/2004 | Kant et al. | 706/50 |
| 7,010,510 | B1 * | 3/2006 | Schellhorn | 705/36 R |
| 2003/0023525 | A1 * | 1/2003 | Chen | 705/35 |
| 2003/0105696 | A1 * | 6/2003 | Kalotay et al. | 705/35 |
| 2003/0135450 | A1 * | 7/2003 | Aguais et al. | 705/38 |

OTHER PUBLICATIONS

Wiiliam T. Lin, "Computing a Multivariate Normal Integral for Valuing Compund Real Options", Kluwer Academic Publishers, dated 2002, pp. 185-209.*
Eknath Belbase, "The Andrew Davidson & Co. lattice implementation of the Black-Karasinsky interest rate process", v2n4 pp. 14-24, 1999.*
"Emperical Tests of Models for Valuation of Pass-Through Mortgage-Backed Securities", The University of Alabama, Auther: Dennis Rand Martin, vol. 5511A of Dissertations Abstracts International, 1994.*

* cited by examiner

*Primary Examiner*—Ella Colbert
*Assistant Examiner*—Hai Tran
(74) *Attorney, Agent, or Firm*—Lowenstein Sandler PC

(57) ABSTRACT

A method of calculating derived variables comprises selecting a model equation, generating Monte Carlo paths and constructing a lattice of state variables, then calculating derived variables on the lattice. Derived variables for each Monte Carlo path are then calculated from the derived variables on the lattice, wherein the Monte Carlo path state variables are not restricted to the lattice node values.

21 Claims, 9 Drawing Sheets

STABILIZED MONTE CARLO TECHNIQUE AND METHOD AND SYSTEM OF APPLYING SAME TO VALUATE ASSETS INCLUDING DERIVATIVE SECURITIES

BACKGROUND OF INVENTION

1. Field of the Invention

The present invention relates generally to methods and systems for calculating derivative variables and, more particularly, to methods and systems for performing stabilized Monte Carlo simulations suitable for valuating assets and securities in the finance industry, including interest-rate sensitive derivative securities.

2. Description of Related Art

Financial entities expend considerable resources to valuate assets, especially securities and derivatives with uncertain payments linked to interest rate movements, credit, equities, foreign exchange and other factors. Examples of such assets include bond options, options on bond futures, swaptions, lookback options, and nearly the entire gamut of mortgage-backed securities (MBS).

The starting point for valuating a derivative security is typically a stochastic model of an interest rate process referred to as a Term Structure Model and the accompanying cash flows with "risk-adjusted" probabilities. With the risk-adjustment, model asset valuations are the probability weighted average discounted values of the cash flows over all possible yield curve evolutions.

In certain circumstances, the present value calculation can be performed analytically by finding an analytically tractable closed form solution or by numerically calculating a stochastic integral. However, it is infeasible for securities with interest-rate path dependent cash flows, such as most MBS. Accordingly, to valuate these securities or to estimate their change in value, some form of Generalized Monte Carlo (GMC) method is generally used.

Monte Carlo (MC) and GMC methods have widespread application in finance for valuation of complex financial derivatives, initially spurred by the publication of Phelan Boyle, "Options: a Monte Carlo approach," Journal of Financial Economics, Vol. 4, pp 323-328, (1977). Since then there have been numerous academic research articles on financial application of Monte Carlo methods, many of which are cited in the survey paper authored by Phelan Boyle, Mark Broadie, and Paul Glasserman, titled "Monte Carlo Methods For Security Pricing," Journal of Economic Dynamics and Control, Vol. 21, pp 1267-1321, (1997). A more recent and comprehensive exposition authored by Peter Jäckel is: "Monte Carlo Methods In Finance," Wiley (2002).

The literature is centered on the speed and accuracy of individual calculations and techniques for improvement of MC and GMC. Frequently, in the financial industry, the primary focus of the simulations is not the theoretical valuation, per se, but the impact of a parameter perturbation. In the context of valuating securities, such evaluation focuses on, for example, the accuracy of a price prediction on a given day. If both an initial valuation estimate and a parameter adjusted estimate are highly accurate, then the estimated theoretical change will also be highly accurate. Thus, much work has been directed to increasing the accuracy of MC and GMC calculations and techniques.

Standard implementations of the GMC procedures may have discontinuous variation in the sample paths of interest rates in response to parameter perturbations such as slight changes in current interest rates or prices of interest rate derivatives. Therefore, minor changes can cause the estimation errors to vary significantly. One common example of this is day-to-day variations in the market environment with correspondingly small changes in the model parameters. Although this should lead to small changes in the derived variables and small changes to the asset valuations, small changes may not be the result due to instability of the GMC estimation.

More specifically, in most GMC implementations, some of the derived variables indirectly depend upon terminal conditions and cannot be computed in analytically tractable closed form from the fundamental values. In such cases, the standard practice is to create a discrete lattice (often referred to as a state grid) for the evolution of the fundamental variables and then apply backward induction techniques to determine the values of the derived variables at the finite lattice points. However, MC methods with the sample paths drawn from a finite state grid are susceptible to parameter instability mentioned above. With a non-continuous mapping of random number draws to grid points, slight parameter changes will often cause discrete changes in a subset of the sample paths. This discontinuity may well result in disproportionate changes in the calculated average value.

The MC estimation process associated with a state grid will converge to the mathematical "true" value as the number of sample paths is increased and the grid is refined. However, the error in generic MC estimates converge to zero at a slow rate, with the expected error proportional to the inverse of the square root of the number of samples. For instance, a fourfold increase in the number of random samples is needed to reduce the expected error by one-half. With enhancements such as stratified sampling, control variates, and other variance reduction techniques, the error can be reduced but not rendered insignificant.

Accordingly, a need exists for an improved method and system of calculating derived variables and of determining actual and prospective changes in the value of securities, that are stable in the face of parametric changes

SUMMARY OF THE INVENTION

The present invention satisfies the foregoing and other needs. A method in accordance with one embodiment of the invention generally comprises selecting a model equation, generating Monte Carlo paths and constructing a discrete lattice, and calculating derived variables on the lattice. Then for each Monte Carlo path, the derived variables for the path are calculated from the derived variables on the lattice, wherein the Monte Carlo path state variables are not restricted to the lattice node values. The value of the stochastic integral is calculated by averaging appropriately over the Monte Carlo paths in a manner known in the art.

The invention accordingly comprises the features of combinations of elements, arrangements of components and methods of operation, which will be exemplified in the systems and methods hereinafter set forth, and the scope of the invention will be indicated in the claims.

BRIEF DESCRIPTION OF THE DRAWINGS

For a fuller understanding of the invention, reference is made to the following description of embodiments of the invention, taken in connection with the accompanying drawing, in which.

DETAILED DESCRIPTION OF CERTAIN EMBODIMENTS

Figure 1A:
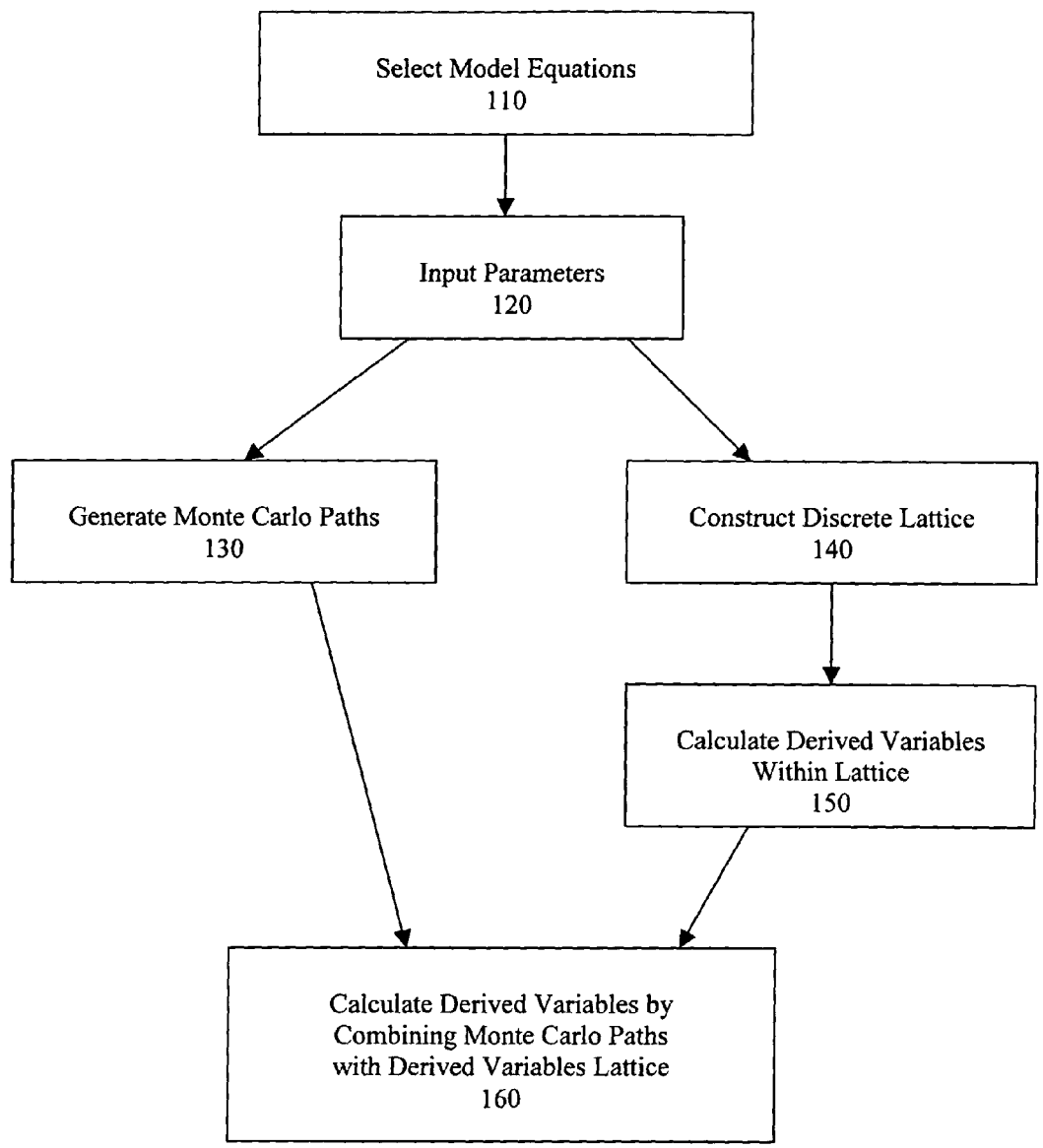
FIG. 1a is a flow chart illustrating the process of calculating derived variables according to an embodiment of the invention.

In general, the present embodiment is directed to a computer implemented method for calculating derived variables, which may be stochastic integrals of other derived variables, their parametric sensitivities, or expectations thereof. Such integrals may be high dimensional, may not have analytically tractable closed form solutions, and therefore, numerical techniques such as Monte Carlo are important. As will be appreciated by those skilled in the art, the method is particularly applicable to the valuation and sensitivity analysis of assets, in particular, those with path dependent claims, such as MBS. It should be noted that the stabilization has an added benefit. For example, if a model is constructed that has a high level of accuracy at one point in time, by, for example, careful choice of random number seeds or similar technique, then the inherent stability of the model will tend to maintain that high level of accuracy in alternate environments, including different points in time. In other words, an accurate model will tend to remain accurate.

As used herein, a "security" is an ownership or creditorship interest, such as a stock certificate, bond, derivative security or any other financial instrument, and a "derivative security" is any contract, transaction or other investment, the value of which is based on or derived from an underlying security, asset or commodity, such as a forward, future, option, put, call, collar, swap, loan, currency contract or the like (including those noted herein) on any security or commodity. This description uses the term "security" for convenience, but it should be understood that the term covers financial instruments generally. Furthermore, it should be understood that the methods and systems described herein may be applied to determining valuation of any desired derived variable even though the embodiments are described in terms of valuation of prices of derivative securities. Thus, for example, the present invention may be applied to determine the price or valuation of a derivative security, such as options, swaptions and mortgage backed securities (MBS), interest rate projections, pass-through mortgage-backed securities, interest-only strips (IOs), principal-only strips (POs), collateralized mortgage obligations (CMOs), collateralized debt obligations (CDOs), collateralized bond obligations (CBOs), credit derivatives, and the like, as well as weather forecasting, geological research, theoretical physics, and the like.

As will be described in greater detail below, in one embodiment, certain parameters are inputted in a selected equation that models the subject derived variable or variables. The particular equation may be dependent on the security being modeled and the derived variables being calculated for valuating such security. Monte Carlo paths and a discrete lattice can be generated for state variables of the equation. The derived variables corresponding to the state variables on the lattice points can be calculated, thereby generating a lattice for the values of the derived variables. Combining the lattice of the derived variables together with the Monte Carlo paths for the state variables, the derived variables associated with the state variables for each time point or node on the Monte Carlo paths, including those that do not coincide with the lattice points, can be calculated. By calculating the derived variables along the Monte Carlo paths rather than derived variables restricted to the lattice points, the present embodiments provide more stability than the known methods allow.

The derived variables may be used in any number of ways. The values of the derived variables may themselves provide useful information, or the values of the derived variables may be used as inputs to other equations. For example, an interest rate derived variable, such as a mortgage rate, at each point along the Monte Carlo path may be based on derived variables, interest rates, state variables and all previous history along the path. Such derived variables may then be used to calculate the cash flow for a particular security, which, in turn, can be used to determine the discounted valuations at each time point. The cash flow values can be summed along each path to get a path value, which represents an ex-post valuation conditioned on the corresponding path of the state variables. The average of the path values thus represents the model theoretical value of the security. Similarly, the derived variables on the Monte Carlo paths may be used to determine average prices or risk neutral expected value of securities. It is also possible to use the method to determine sensitivities, for example, how price or other derived variable changes in response to changes in parameters.

As will be appreciated by those skilled in the art based on the disclosure herein, the instability of the common methods of determining derived variables and valuating securities is corrected with the present embodiment. With traditional lattice techniques, slight changes in the lattice can create entirely different results using a pure lattice theory. Slight changes in the predicted values of the state variables can also change the value of derived variables significantly depending on the density of the lattice. The potentially significant changes in traditional lattice values result from the state and derived variables being restricted to grid points on the lattice. In contrast, the stability of the present embodiment is independent from the lattice. The resulting enhanced stability is possible because the Monte Carlo paths are drawn from the continuum of possible values of the state variables while the derived variables at each point along the Monte Carlo paths are calculated from the derived variables on the lattice. Therefore, the values of the derived variables depend on the simulation of Monte Carlo paths, providing stability.

The present embodiment, which is directed to a computer implemented method for calculating derived variables for determining prospective changes in value of securities, will now be described with reference to FIGS. 1a and 1b.

Figure 1B:
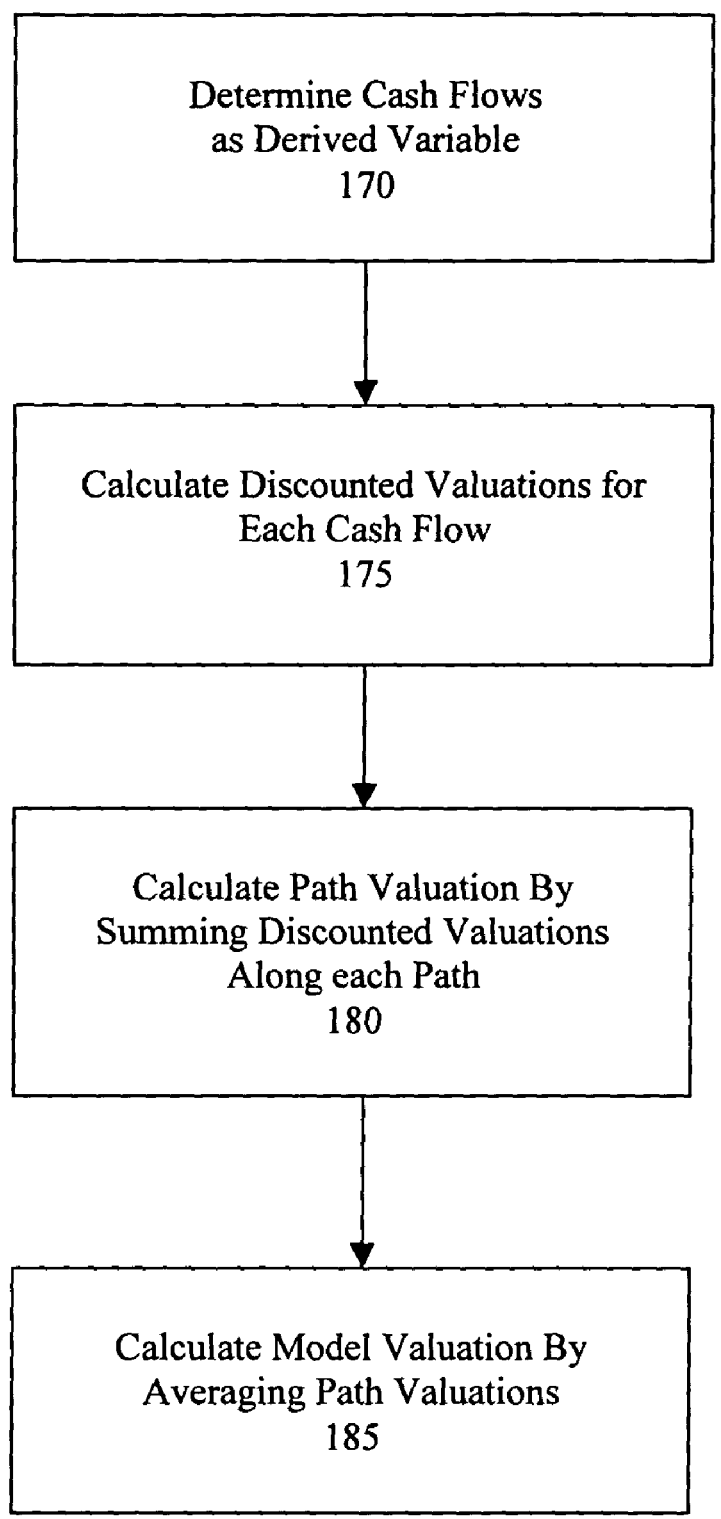
FIG. 1b is a flow chart illustrating the process of valuating a security according to an embodiment of the present invention.

As seen in FIG. 1a, the initial step is identifying an equation that models the relation of the one or more derived variables to be calculated to the one or more state variables and the equations that govern the evolution of the state variables. Step 110. It should be understood that the model equations are dictated by the use to which the present method is directed and, therefore, the derived variables to be calculated. Moreover, it is not a required aspect of the present invention to derive such equations; indeed, the present embodiment is applicable essentially to variables that are stochastic integrals or expectations thereof which may lack analytically tractable closed form solutions. Furthermore, such model equations are generally known and include, for example, interest rate process, referred to as Term Structure Models. Examples include multiple factor short rate models, such as, for example, Black-Derman-Toy, Black-Karasinski, Cox-Ingersoll-Ross, and the like, and market models, such as, for example, Heath-Jarrow-Morton and Brace-Gatarek-Musiela, all of which are commonly known in the art as disclosed in publications such as Björk, "Arbitrage Theory in Continuous Time," Oxford Univ. Press, 1998 and Brigo, Mercurio, "Interest Rate Models Theory and Practice, Springer, 2001. The present invention may be applied to Markovian and non-Markovian equations as well.

Once the model has been selected, parameters of the selected equation are inputted into the equation. Step 120. Such parameters are dictated by the model equations and many include current and/or historical data, as well as security-specific and/or general market information.

Figure 2:
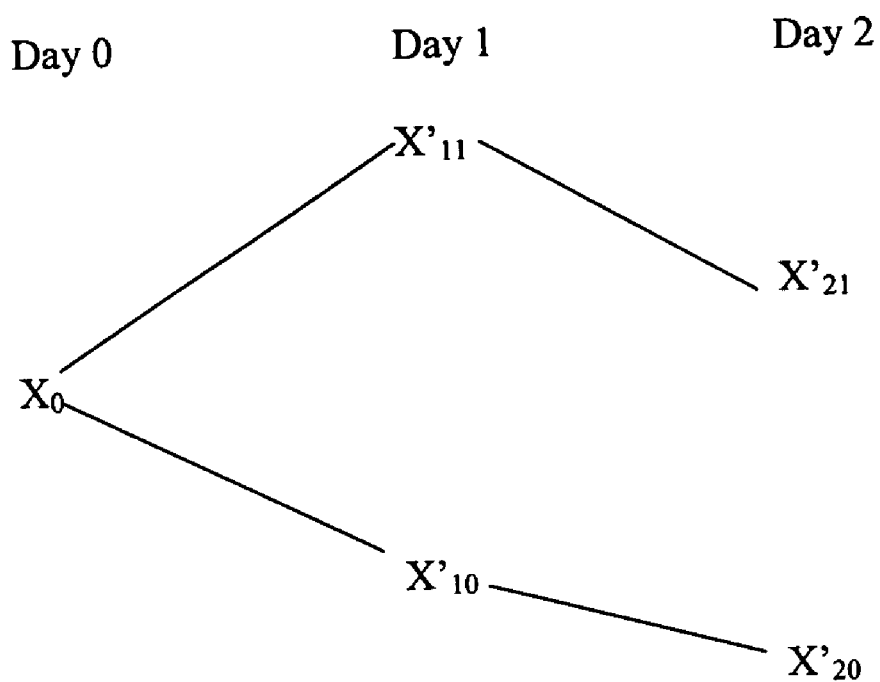
FIG. 2 is a diagram illustrating the simulated Monte Carlo paths according to an embodiment of the invention.

Using the model and the inputted parameters, Monte Carlo paths for different values of the state variables in the model equation are generated using known standard techniques. Step 130. FIG. 2 shows a logical representation of two example Monte Carlo paths generated at daily intervals. On Day 1 (the present day), the state variable has a starting value of X, which is a known value. Based on the model being used and X, the value of the state variable is simulated for Day 2 and Day 3, resulting in $X'_{11}$ and $X'_{21}$, respectively, in one path, and $X'_{10}$ and $X'_{20}$, respectively, in an alternate path, both shown in FIG. 2. The value of each subsequent day's state variable is not limited to certain values or intervals, but is the value resulting from the Monte Carlo simulation of the particular path.

The time interval can be set at various intervals, such as daily, weekly or monthly, according to the desired use of the method; the daily time interval was selected for illustrative purposes only and in fact, need not even be uniform. Similarly, the complexity of the Monte Carlo paths will be dependent upon the subject model equation. Thus, the Monte Carlo may include any number of state variables. Furthermore, the number of paths generated may vary depending upon the desired accuracy. In general, several hundred to thousands of Monte Carlo simulation paths may be needed for determining derived variables such as asset prices. At the time of writing, pass-through mortgage backed securities may be adequately valued using 500 paths, options on mortgages may need several thousand, and certain options may in fact require tens of thousands depending on the asset, the equations, the parameters, the market environment and the desired accuracy. In certain embodiments if, at any time in the process it is determined that greater accuracy and, thus, more paths are desired, the process returns to the step of generating paths.

Figure 3:
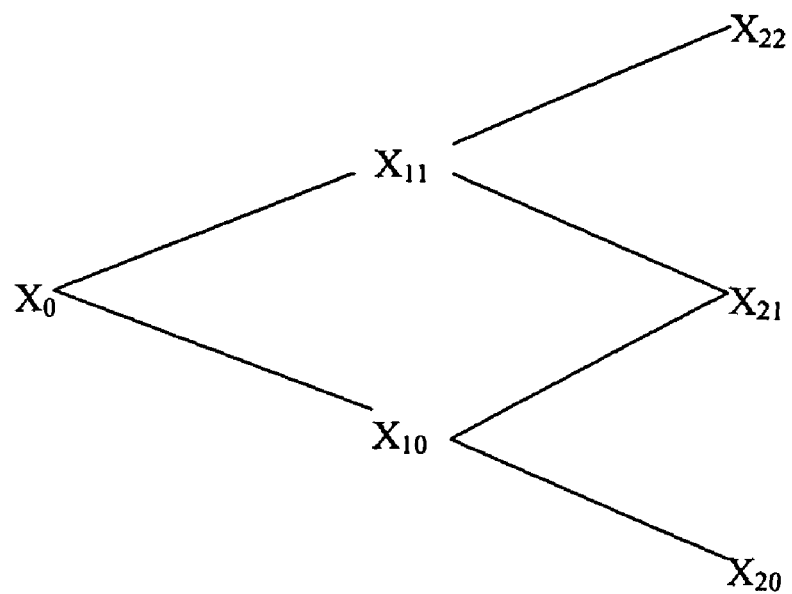
FIG. 3 is a diagram illustrating the Discrete Lattice according to an embodiment of the invention.

Also using the model and the inputted parameters, a discrete lattice is generated in accordance with known techniques. Step 140. In general, construction of such a lattice is within the skill of those of ordinary skill in the art and is described in Hull, "Options, Futures and Other Derivatives $5^{th}$ Ed.," Prentice Hall, 2003. An exemplary lattice is shown in FIG. 3 for illustrative purposes. As illustrated, the exemplary time period is daily, and the order is binomial, although other time periods and orders are within the scope of the present invention. The initial value of the state variable is known to be $X_0$ on Day 0 (the present day). Since a binomial lattice is shown, for illustrative purposes there are two possible values of the state variable on Day 1, $X_{10}$ and $X_{11}$. There are three possible state variable values for Day 2: $X_{20}$, $X_{21}$ and $X_{22}$. This trend continues for each subsequent time interval according to the model, although FIG. 3 only shows Day 0 to Day 2. Unlike the Monte Carlo simulations, which are continuous, the values of the state variable for the lattice are discrete, limited to certain points on the lattice for each Day. Thus, the only possible values on Day 1 are $X_{10}$ and $X_{11}$, and the only possible values on Day 2 are $X_{20}$, $X_{21}$ and $X_{22}$.

It is to be understood that the lattice may be generated in any manner, for example, using any time discretization and being of any dimensionality (number of independent variables of the fundamental process) and of any branching order. However, because the present embodiment combines the results of the Monte Carlo simulations and lattice, certain relationships between the two preferably (although not necessarily) exist. Specifically, the Monte Carlo and lattice are performed preferably over the same number of time periods. Furthermore, as discussed below, it is preferable, but not required, that the lattice be wide enough (e.g., include a sufficient range of state variable values) such that the Monte Carlo paths fall within the lattice. In this regard, it has been found that a nine-way branching lattice is sufficiently big (i.e., having sufficiently wide range of variable values) to achieve this result for derivative securities when the time periods are sufficiently small and the model has two fundamental stochastic variables. Similarly, as also discussed below, the lattice is preferably sufficiently dense (e.g., small enough time period) such that there is a sufficiently high probability that the Monte Carlo values for the state variables fall within the boundaries of the lattice.

Notably, there exists a trade-off between the density, time steps and expanse of the lattice, on one hand, and the computational complexity and expenditure of resources, on the other hand. A similar trade-off exists when generating the Monte Carlo simulations.

Figure 4:
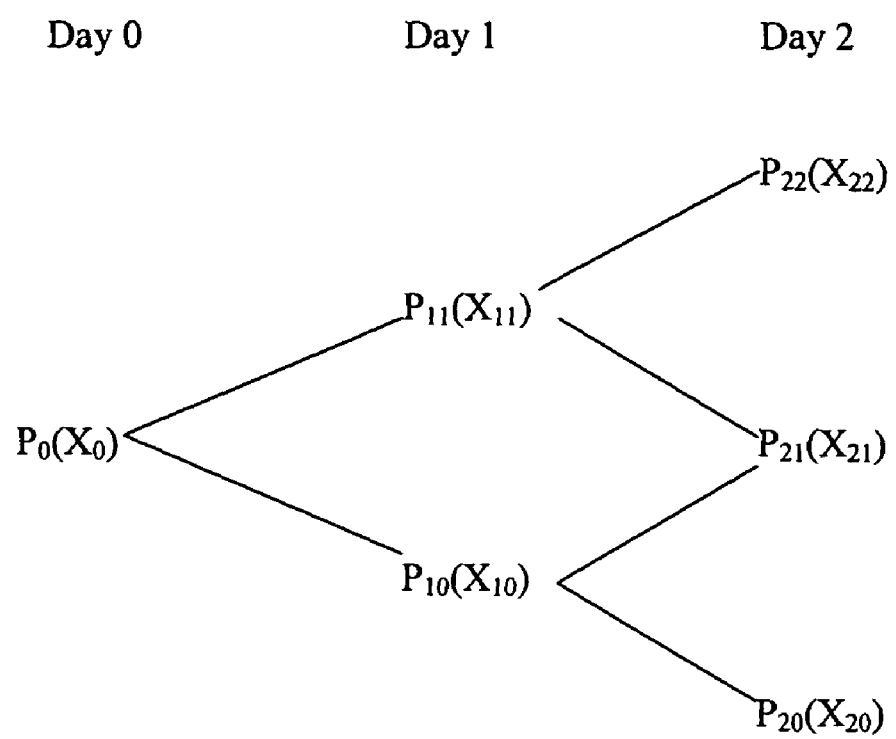
FIG. 4 is a diagram illustrating the Derived Variable Lattice according to an embodiment of the invention.

Once the lattice is created, derived variables are calculated for each point on the lattice, thereby constructing a lattice of derived variables. Step 150. Such process is known in the art, using the state variable values at each node and standard backward induction techniques. An illustrative logical representation of a lattice of derived variables based on the state variable lattice of FIG. 3 is shown in FIG. 4 where the derived variable P is a function of state variable X, represented by P(X). The lattice of derived variables preferably maintains the same branching distribution and density of the lattice for the state variables, thus as illustrated in FIGS. 3 and 4, both the lattice for the state variables and the lattice of derived variables are binomial on a daily period.

As illustrated in FIG. 4, the derived variable, P, is a function of the state variable, X, and has an initial value $P_0(X_0)$ on Day 0, and there are two possible values of P on Day 1: $P_{10}(X_{10})$ and $P_{11}(X_{11})$; and three possible values on Day 2: $P_{20}(X_{20})$, $P_{21}(X_{21})$ and $P_{22}(X_{22})$. Although FIG. 4 only shows Day 0 to Day 2, this trend continues for each subsequent time interval according to the model. The derived variables lattice provides discrete values, limited to the points on the lattice for each time interval, and is not continuous. Therefore the only possible values of the derived variable on Day 1 is $P_{10}(X_{10})$ and $P_{11}(X_{11})$, and $P_{20}(X_{20})$, $P_{21}(X_{21})$ and $P_{22}(X_{22})$ on Day 2.

Figure 5:
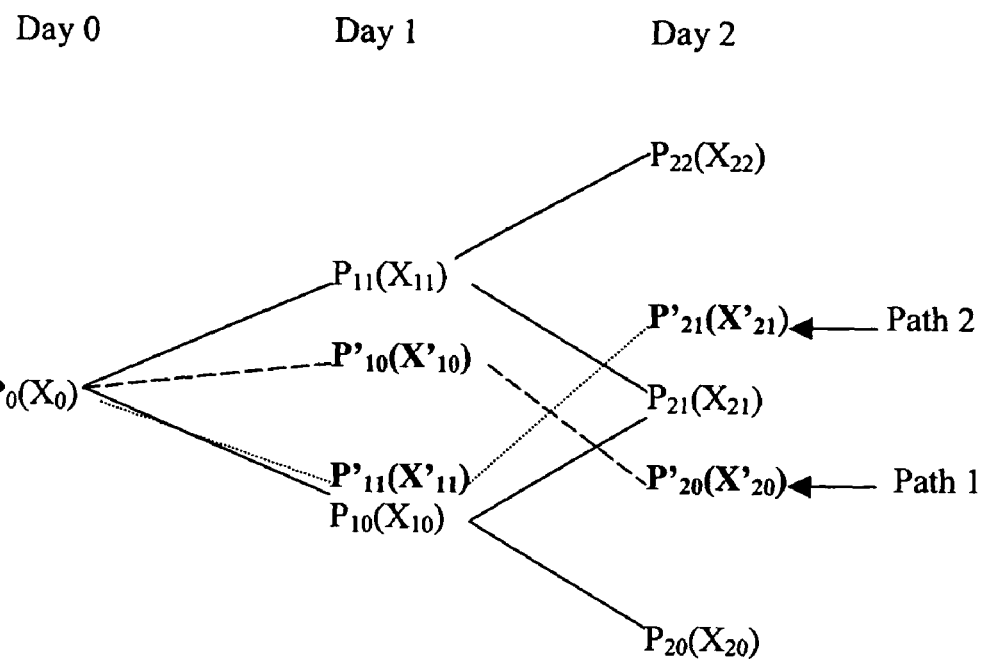
FIG. 5 is a diagram illustrating the combined Monte Carlo paths and Derived Variable Lattice according to an embodiment of the invention.

The process continues by calculating the values of the derived variables associated with the state variables on the Monte Carlo paths by combining the Monte Carlo paths and the lattice of derived variables. Step 160. More specifically, the derived variable corresponding to each state variable point along each Monte Carlo path is calculated based on the lattice values for the derived variables. The Monte Carlo values for the derived variables are determined in the present embodiment, for example, by multi-dimensional interpolation, by taking the closest lattice points for each dimension on the derived variables lattice as reference points to calculate the value of the derived variables of each state variable on the Monte Carlo path. Such combining can be logically illustrated with reference to FIGS. 3-5. Once the derived variable lattice of FIG. 4 is generated according to the state variable lattice, shown in FIG. 3, the state variable points on the Monte Carlo paths are placed into the lattice logically represented by the dashed and dotted lines in FIG. 5. In FIG. 5, the derived variable based on the Monte Carlo paths, P', is a function of the state variables on the paths, X'. Once the state variable values are placed into the lattice, their respective derived variables are calculated using the nearest points on the derived variables lattice.

Referring to the illustrative example of FIG. 5, Monte Carlo Path 1 is placed into the derived variable lattice. In order to calculate $P'_{10}(X'_{10})$, the lattice points $P_{10}(X_{10})$ and $P_{11}(X_{11})$, which are the only lattice points surrounding $P'_{10}(X'_{10})$, are used to interpolate the value of $P'_{10}(X_{10})$. Similarly, $P_{20}(X_{20})$ and $P_{21}(X_{21})$ are used to interpolate the value of $P'_{20}(X'_{20})$. For example, if $X'_{10}$ is 3, $X_{10}$ is 1, $X_{11}$ is 4, $P_{10}(X_{10})$ is 5 and $P_{11}(X_{11})$ is 20, then $P'_{10}(X'_{10})$ can be determined to be 15 through linear interpolation. Similarly, if $X'_{20}$ is 15, $X_{20}$ is 5, $X_{21}$ is 20, $P_{20}(X_{20})$ is 20 and $P_{21}(X_{21})$ is 50, then $P'_{20}(X'_{20})$ can be determined to be 40. Referring to Path 2 of FIG. 5, if the numerical value of $X'_{11}$ is 1.2, $P'_{11}(X'_{11})$ can be determined to be 6 by linear interpolation using the surrounding lattice points, $P_{10}(X_{10})$ and $P_{11}(X_{11})$. Similarly, $P_{21}(X_{21})$ and $P_{22}(X_{22})$ are used as reference points to calculate $P'_{21}(X'_{21})$. If $X'_{21}$ is 25, $X_{21}$ is 20, $P_{21}(X_{21})$ is 50, $X_{22}$ is 35, and $P_{22}(X_{22})$ is 80, then $P'_{21}(X'_{21})$ can be determined to be 60.

Another possible method for calculating the derived variables for the state variables along the Monte Carlo paths is extrapolation. For example, if the state variable of the Monte Carlo path does not fall within the lattice (i.e., the state variable on the Monte Carlo path is not surrounded by lattice points, interpolation is not possible. Extrapolation can then be used to calculate the derived variable. Because interpolation generally results in greater accuracy, the lattice is preferably created sufficiently wide such that all Monte Carlo points fall within the lattice. Thus, in one embodiment, the lattice is deemed sufficiently wide if no more than one out of every 500 Monte Carlo trials falls outside the lattice. If more than one out of every 500 trials fall outside of the lattice, thereby compromising accuracy, then, in alternate embodiments, the process repeats steps 140 and 150 using known techniques, such as increasing the number of branches of the lattice and/or decreasing the time steps to increase the span of the lattice. It is understood that any type of interpolation and/or extrapolation is within the scope of the present invention although the present embodiment employs an n-dimensional quadratic equation to interpolate and/or extrapolate the derived variable values on the Monte Carlo paths, where n is the highest order feasible based on the lattice state variable data points. The result of this step is, for each Monte Carlo path, the derived variables are calculated for each state variable using the derived variable lattice, thereby creating a derived variable path corresponding to each Monte Carlo state variable path.

It should be noted that while the present embodiment results in calculated derived variable values for each of the plurality of Monte Carlo paths which can be averaged, it is within the scope of the present invention to calculate distributions of derived variables at various time points in addition to averages or expectations.

As noted above, the values of the derived variables may be used in any number of ways and for any number of purposes, including those uses known in the art. While such uses are known, as are the processes for using the values of derived variables are known, the present embodiment enhances the results of such uses by providing inputs (i.e. values of derived variables) having greater stability. Exemplary uses of the derived variables thus include, for example, securities that derive their cash flows (and thus market values), either directly or indirectly, from interest rates or securities based thereon, (such as, for example, bonds, CMOs, MBSs, CBOs and the like), calculating cash flows based on interest rate derived variables and their past values. The derived variable being calculated may also be the price of an asset or security, where the average value of the derived variable across all paths for a particular time period represents the theoretical price for that time period. The present embodiment for calculating derived variables may also be used to measure or assess sensitivity of the derived variable to a parameter. In such an embodiment, one form sensitivity is measured by computing the sensitivity of asset prices to changes in the environment. For example, dollar duration is the first derivative of the asset price with respect to interest while dollar convexity is the second derivative. Another example is Option Adjusted Spread (OAS), the additional spread to the discount rate to adjust the model value to a market price, which may change day to day along with market conditions. The stability of the error in computing the OAS, duration, convexity and other derived quantities when faced with small day to day changes is crucial for accurately estimating the actual changes.

One particular use of the calculated derived variables will now be described in greater detail with reference to FIG. 1b. The exemplary use is valuating a mortgage backed fixed coupon bond, wherein the calculated derived variables are long term interest rates, mortgage rate, and finally the bond price. The example model equation is a term structure model having current market interest rate and interest rate derivative prices as parameters, known to those skilled in the art, as a risk-neutral term structure model.

Having calculated the derived variables, such as long-term interest rates and mortgage rates, corresponding to each set of state variables along each Monte Carlo path (as described in connection with step 160 of FIG. 1a), the valuation process continues with determining the cash flows corresponding to each point (i.e., set of state variables) along each Monte Carlo path. Step 170. Calculating the cash flows based on the values of the state variables and the derived variables is known in the art and generally includes the steps of projecting homeowner prepayments through the use of a prepayment model, amortizing the security appropriately, and computing the pass-through interest and principal payments due the bond holder.

Once the cash flows are calculated, the process continues with calculating the discounted value of the cash flows of the bond at each point along each Monte Carlo path. Step 175. In general, calculating the discounted valuation based on the cash flows, a process known to those skilled in the art, includes taking a present value together with additional spreads (or OAS) to ultimately match market pricing.

With the discounted valuation calculated for each point along the paths, the values can be summed along each path, thereby obtaining the present value of the cash flows for each path, referred to herein as the path valuation. Taking the average of all path valuations results in a model valuation, which is a theoretical expected model value of the bond.

Figure 6:
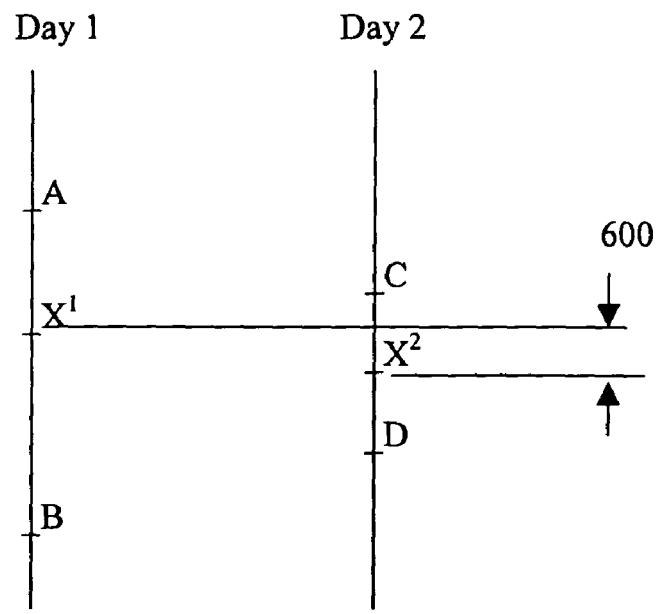
FIGS. 6 and 7 are diagrams illustrating the stability of a Monte Carlo path according to an embodiment of the invention.
Figure 7:
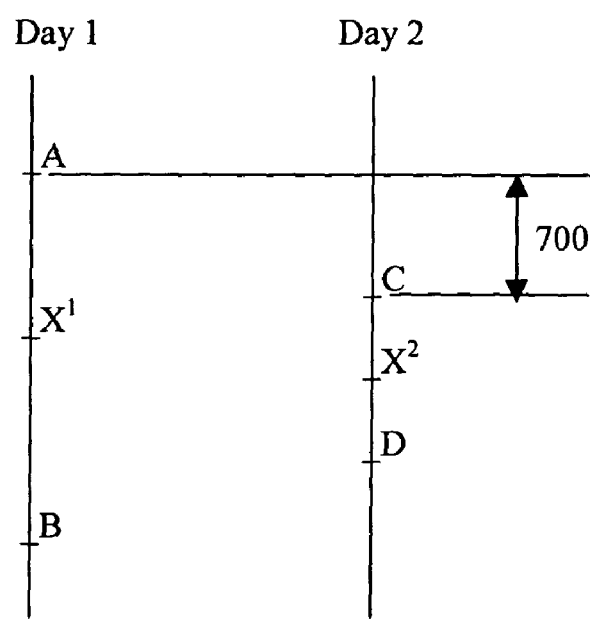

Referring to FIGS. 6 and 7, in which the vertical axis represents the value of a derived variable at some particular time interval, the stability of the aforementioned embodiments and the instability of the traditional method are illustrated. The values of the state variables at identically referenced nodes in the lattices and on the Monte Carlo paths are identical. For the example, there is a single Monte Carlo path, which while extreme, remains illustrative. FIGS. 6 and 7 show a portion of a lattice for two time periods, e.g., Day 1 and Day 2. Because of discretization, the lattice points for subsequent time intervals can differ from the previous by varying amounts, as illustrated by Day 1 and Day 2 lattice points in the figures. The lattice points can shift, disappear entirely, or new lattice points can appear. In FIGS. 6 and 7, $X^1$ and $X^2$ represent the calculated derived variable points on a Monte Carlo path using the methods described herein, and A, B, C and D represent derived variables on the lattice. FIG. 6 shows the difference in value 600 of the calculated derived variables of a Monte Carlo path for time intervals Day 1 and Day 2. FIG. 7 shows the difference in value 700 of derived variables when determined using the common practice of drawing Monte Carlo paths from the lattice. It is notable that using the traditional method, a minor change in the Monte Carlo path from Day 1 to Day 2 may cause a dramatic change in the lattice point representing the value of the derived variable, whereas using the method of the present embodiment results in greater stability by not restricting the derived variable based on the Monte Carlo path to lattice points. For example, if the numerical value of lattice points A is $140, B is $20, C is $100, D is $40, Monte Carlo points $X^1$ and $X^2$ are $90 and $80 respectively, the difference in value 600 from Day 1 to Day 2 of the embodiment is $10. In contrast, the difference in value 700 using the common method of using pure lattice points is $40. On two successive days, there are two lattices, each of which represents the fundamental equation for the respective days. However, a path walking through such lattices may be similar or suddenly deviate due to small changes in probabilities because of the restriction to remain on the lattice nodes, thereby leading to instabilities. One can conceive two lattices with identical values of the state variables, but with slightly differing state transition probabilities. There can be a significant chance that somewhere along a Monte Carlo path, a different branch will be taken in one lattice than in the other, which leads to different values of the derived and state variables along the remainder of the Monte Carlo path. In short, the present embodiment combines the accuracy of the lattice with the stability of the Monte Carlo simulations.

Figure 8A:
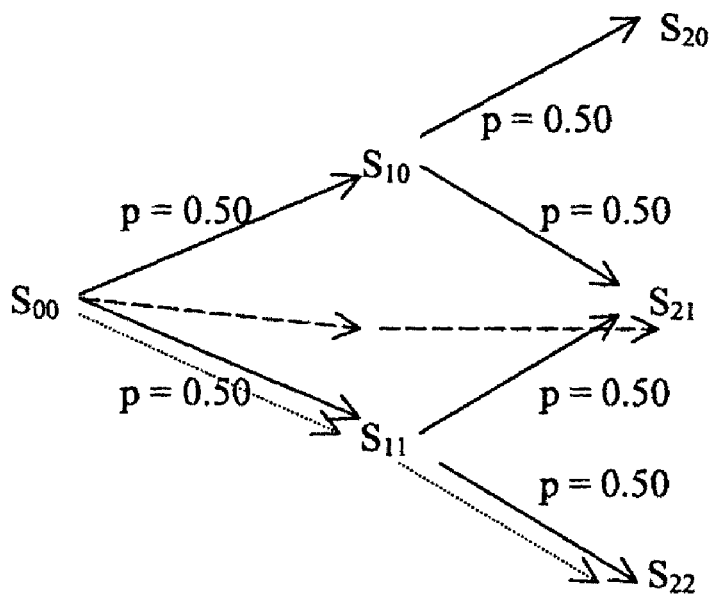
FIGS. 8a and 8b are diagrams illustrating the instability of Monte Carlo simulations constrained to lattice nodes.
Figure 8B:
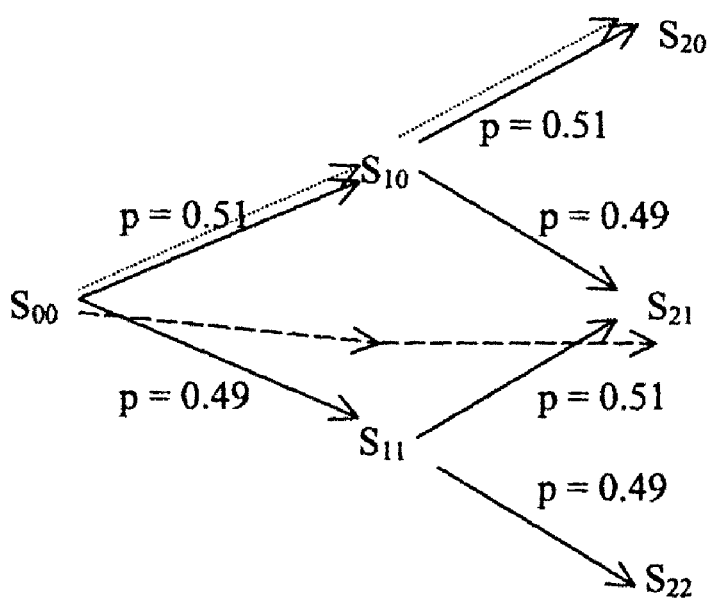

Consider the two example lattices shown in FIGS. 8a and 8b. The values of the state variables at identically referenced nodes in the lattices are identical; however, the transition probabilities among the states is slightly different in the two examples as indicated therein (p). As illustrated, a Monte Carlo simulation that is constrained to the lattice points can generate different paths for the same sequence of random number draws. At each time point along each path, a random number is generated with a uniform (0, 1] distribution. In the example, the sample path transition is to the lower node if the random number is less than the specified probability of that transition. For the sake of argument, and without loss of generality, assume that the sequence of two random number draws for a single path is {0.495, 0.495}.

In the lattice of FIG. 8a, starting at state $S_{00}$, the Monte Carlo path will contain $S_{11}$ if the draw is less than or equal to 0.5 and will contain state $S_{10}$ if the draw is strictly greater than 0.5, and similarly, for transitions from states $S_{10}$ and $S_{11}$ as illustrated in the Figure. In the lattice of FIG. 8b, the states are identical, but the transition probabilities are altered very slightly so that starting at state $S_{00}$, the Monte Carlo path will contain $S_{11}$ if the random number draw is less than or equal to 0.49, and will contain state $S_{10}$ if the draw is strictly greater than 0.49, and similarly for transitions from states $S_{10}$ and $S_{11}$.

In the case of the sequence of random number draws 0.495, 0.495, where the first random number determines the transition from state $S_{00}$ to either $S_{10}$ or $S_{11}$, and the second random number determines the transition from either $S_{10}$ or $S_{11}$ to one of $S_{20}$, $S_{21}$ or $S_{22}$.

In the lattice of FIG. 8a, the Monte Carlo path will be sequence of states $\{S_{00}, S_{11}, S_{22}\}$, whereas in the perturbed lattice of FIG. 8b, the Monte Carlo path will be the sequence of states $\{S_{00}, S_{10}, S_{20}\}$ (where the dotted lines indicate paths), thus illustrating how the same sequence of random number draws can lead to different Monte Carlo paths even for lattices where the states and accompanying state variables are identical, but have very small differences in the state transition probabilities.

Using the techniques illustrated in the foregoing embodiments, the sequence of states and associated state variables will be essentially identical whether derived from the lattice of FIG. 8a or of FIG. 8b. This is precisely because the Monte Carlo states are not constrained to lie on lattice points, and hence, the results using the Monte Carlo paths in accordance with such embodiments, as represented in dashed lines, will be stable compared to the results derived from a Monte Carlo simulation on the lattice.

Figure 9:
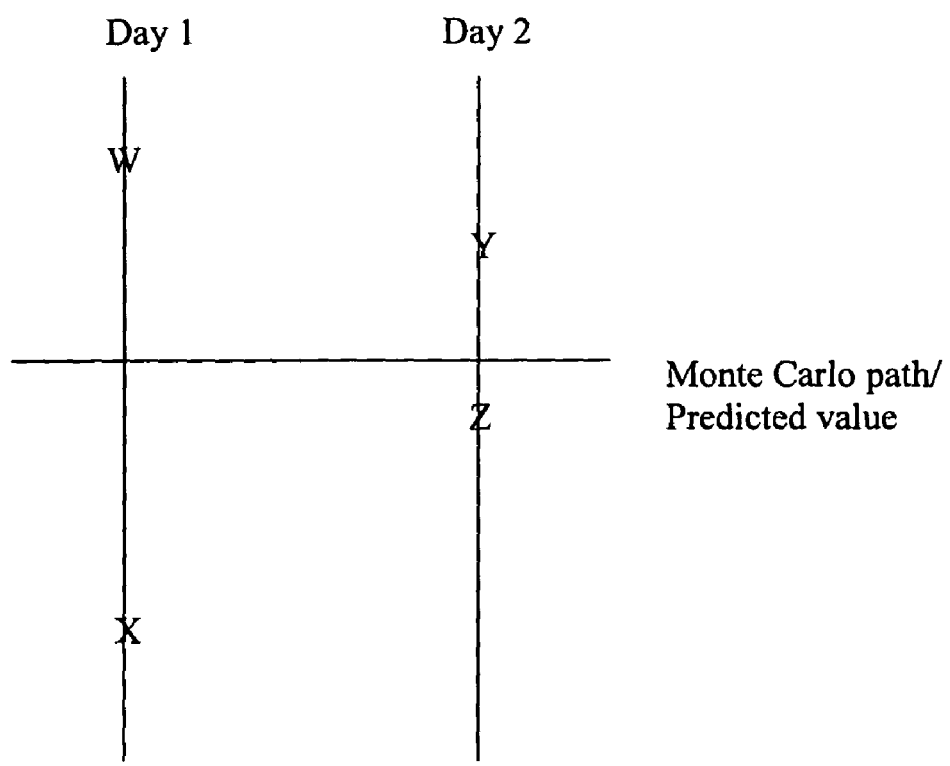
FIG. 9 is a diagram illustrating the instability of Monte Carlo simulations constrained to lattice nodes.

Also, the discretization of the lattice can create a significant change in the calculated values of the derived variable when the state variables are limited to the lattice points. As shown in FIG. 9, although the simulated Monte Carlo path or predicted values represented by the solid line remain constant from Day 1 to Day 2, a change in the lattice structure can cause a substantial change in a Monte Carlo simulation that is constrained to the lattice points. For example, as illustrated in FIG. 9, the Monte Carlo simulation is closest to the lattice point W and therefore the Monte Carlo path will contain state W on Day 1. In contrast, Z is the closest lattice point on Day 2, and therefore the Monte Carlo path will contain state Z on Day 2. Although the values of the Monte Carlo simulation remained constant from Day 1 to Day 2, the values contained in the path differ due to the limitations of the lattice. In contrast, when the derived variables of Monte Carlo paths are calculated by preferably interpolating the values from a lattice rather than being strictly lattice points, the accuracy or discretization of the lattice does not affect its value, thereby providing stability.

It is further to be understood that the methods and processes described herein may be performed by a specially programmed computer or other processor, in which the software program configures the processor to receive inputs, such as the model equation and parameters, calculate necessary values, such as state variable values and derived variable values, as well as interim values necessary in calculating such values, including random number vectors, and store and retrieve from memory values, such as parameters, state variable values and derived variable values.

It should be understood that the foregoing embodiments may be implemented by a computer system, having one or more processors running one or more software programs, applications, objects or the like to perform the functions described herein. In general, the software is programmed to use various inputs, such as the model equations and market data, to generate the Monte Carlo paths and lattice of state variables and to calculate the values of the derived variables on the lattice and along the Monte Carlo paths. Such values may be stored either locally to the processor or remotely, in an electronic or optical storage medium. Furthermore, the software may use the derived variables as described above, including to calculate cash flows and discounted valuations.

Without departing from the spirit and scope of this invention, one of ordinary skill in the art can make various changes and modifications to the invention to adapt it to various usages and conditions. For example, it is within the scope of the present invention to perform steps of the processes described herein in different orders (e.g., calculating the monte carlo state variable paths before, after or simultaneously with generation of either or both lattices), utilize different system hardware and software, modify time periods identified herein, and the like. Moreover, the particular equations used herein are exemplary, as the structure and methods disclosed herein are amenable to use with other equations regardless of their complexity or dimensionality. For example, use of an average of numbers is merely exemplary and is intended to cover all calculations based on the such numbers, including weighted averages, moving averages or other formulae. As such, these changes, modifications and alternatives are properly, equitably, and intended to be, within the scope of the following claims.

What is claimed is:

1. A computer-implemented method for valuating a security, said
    method comprising the steps of:
        selecting a model equation, stored in an electronic storage medium on a computer, for modeling the relation of one or more derived variables and one or more state variables;
        receiving one or more parameters related to the selected model equation, wherein the one or more parameters includes current data, historical data, security-specific data or general market data stored in an electronic storage medium on a computer, and wherein the use of data received as a parameter is dictated by the model equation selected by the computer configured to process the one or more parameters;
        generating one or more Monte Carlo paths for the one or more state variables based on the one or more parameters related to the selected model equation;
        generating a lattice for the one or more state variables;
        calculating, by the computer, values of the at least one derived variable on the lattice;
        calculating, by the computer, values of the at least one derived variable on the Monte Carlo path based on the values of the at least one derived variable on the lattice; and
        providing a valuation for the security based on the at least one derived variable.

2. The method of claim 1, wherein valuating the security includes calculating cash flow based on the at least one derived variable.

3. The method of claim 2, wherein valuating the security includes calculating discounted valuation of the cash flow.

4. The method of claim 3, wherein valuating the security includes summing the discounted valuation of the cash flow along each Monte Carlo path, thereby obtaining present value of each cash flow.

5. The method of claim 4, wherein valuating the security includes calculating an average present value of cash flow and obtaining a theoretical expected model value.

6. The method of claim 1, wherein the selected model equation comprises a stochastic differential equation.

7. The method of claim 1, wherein the selected model equation comprises an interest rate process.

8. The method of claim 7, wherein the interest rate process comprises a Term Structure Model.

9. The method of claim 1, wherein the one or more derived variables comprise a stochastic integral of other derived variables.

10. The method of claim 1, wherein the one or more derived variables comprise a mortgage rate.

11. The method of claim 1, wherein the one or more derived variables comprise an asset price.

12. The method of claim 1, wherein the selected model equation includes additional variables.

13. The method of claim 1, wherein the at least one derived variable is dependent on the one or more state variables.

14. The method of claim 1, wherein the at least one derived variable is dependent on the one or more state variables and previous history along the path.

15. The method of claim 1, wherein the at least one derived variable is an interest rate derived variable based on derived variables, interest rates, state variables and all previous history of state variables.

16. The method of claim 1, wherein the security is a mortgage-backed security and the at least one derived variable is an interest rate.

17. A computer-implemented method of calculating one or more derived variables for valuating a mortgage backed fixed coupon bond, said method comprising the steps of:
    selecting a term structure model equation, stored in an electronic storage medium on a computer, for calculating derived variables based on one or more state variables;
    receiving one or more parameters related to the term structure model equation, the one or more parameters including data for at least one current market interest rate and at least one interest rate derivative price;
    generating one or more Monte Carlo paths for the one or more state variables based on the one or more parameters, each of the one or more Monte Carlo paths having a plurality of Monte Carlo path points;
    generating a lattice for the one or more state variables;
    calculating, by the computer, derived variables on the lattice of state variables;
    calculating, by the computer, derived variables on the Monte Carlo paths based on the derived variables on the lattice, wherein the plurality of Monte Carlo path points include points on and off the lattice for stabilizing the Monte Carlo path; and
    providing a valuation for the mortgage backed fixed coupon bond based on the at least one derived variable, wherein the at least one derived variable calculated is a long term interest rate, a mortgage rate or a bond price.

18. The method of claim 17, wherein calculating derived variables on the Monte Carlo paths includes calculating derived variables for the plurality of Monte Carlo path points based on values of derived variables in the lattice of derived variables.

19. The method of claim 18, wherein the plurality of Monte Carlo path points have one or more associated state variables and wherein the derived variables on the lattice have one or more associated state variables, wherein calculating the derived variables includes comparing state variables of the plurality of Monte Carlo path points with nearby state variables of the lattice of derived variables and calculating derived variables based on the comparison.

20. The method of claim 19, wherein calculating the derived variables based on the comparison includes interpolations.

21. The method of claim 19, wherein calculating the derived variables based on the comparison includes extrapolation.

* * * * *